US008667252B2

(12) United States Patent
Colavin et al.

(10) Patent No.: US 8,667,252 B2
(45) Date of Patent: Mar. 4, 2014

(54) METHOD AND APPARATUS TO ADAPT THE CLOCK RATE OF A PROGRAMMABLE COPROCESSOR FOR OPTIMAL PERFORMANCE AND POWER DISSIPATION

(75) Inventors: Osvaldo Colavin, San Diego, CA (US); Davide Rizzo, San Diego, CA (US)

(73) Assignee: STMicroelectronics, Inc., Coppell, TX (US)

( * ) Notice: Subject to any disclaimer, the term of this patent is extended or adjusted under 35 U.S.C. 154(b) by 2014 days.

(21) Appl. No.: 10/301,372

(22) Filed: Nov. 21, 2002

(65) Prior Publication Data

US 2004/0103263 A1 May 27, 2004

(51) Int. Cl.
*G06F 9/30* (2006.01)

(52) U.S. Cl.
USPC .......................................................... 712/15

(58) Field of Classification Search
USPC .......................................... 712/34, 32, 24, 15
See application file for complete search history.

(56) References Cited

U.S. PATENT DOCUMENTS

| | | | |
|---|---|---|---|
| 5,777,928 A * | 7/1998 | Vidwans et al. | 365/189.05 |
| 5,815,715 A * | 9/1998 | Ku.cedilla.uk.cedilla.akar | 717/141 |
| 6,026,479 A * | 2/2000 | Fisher et al. | 712/24 |
| 6,256,724 B1 * | 7/2001 | Hocevar et al. | 712/35 |
| 6,269,437 B1 * | 7/2001 | Batten et al. | 712/28 |
| 6,542,988 B1 * | 4/2003 | Tremblay et al. | 712/225 |
| 2001/0014938 A1 | 8/2001 | Bisinella | |

FOREIGN PATENT DOCUMENTS

| | | |
|---|---|---|
| EP | 0 479 390 A2 | 4/1992 |
| WO | WO 96/08777 A1 | 3/1996 |
| WO | WO 97/44728 A1 | 11/1997 |

\* cited by examiner

*Primary Examiner* — Robert Fennema
(74) *Attorney, Agent, or Firm* — Munck Wilson Mandala, LLP

(57) ABSTRACT

Clustered VLIW processing elements, each preferably simple and identical, are coupled by a runtime reconfigurable inter-cluster interconnect to form a coprocessor executing only those portions of a program having high instruction level parallelism. The initial portion of each program segment executed by the coprocessor reconfigures the interconnect, if necessary, or is skipped. Clusters may be directly connected to a subset of neighboring clusters, or indirectly connected to any other cluster, a hierarchy exposed to the programming model and enabling a larger number of clusters to be employed. The coprocessor is idled during remaining portions of the program to reduce power dissipation.

21 Claims, 6 Drawing Sheets

Original Code
```
for (i=0; i<imax; i++) {
   y[i]=c3*x[i+3]+c2*x[i+2]
        +c1*x[i+1]+c0*x[i]
```

Pseudo-assembler
(pre-loop initializations not shown)
```
# i initialized to -1
i=i+1
i.p=(i<imax)
ax=x+1
x_{i+3} = [ax]
p0=x_i*c0
p1=x_{i+1}*c1
p2=x_{i+2}*c2
p3=x_{i+3}*c3
s2=p3+p2
s1=s2+p1
s0=s1+p0
ay=y+i
[ay]=s0
```

Loop data flow graph

METHOD AND APPARATUS TO ADAPT THE CLOCK RATE OF A PROGRAMMABLE COPROCESSOR FOR OPTIMAL PERFORMANCE AND POWER DISSIPATION

TECHNICAL FIELD OF THE INVENTION

The present invention is directed, in general, to runtime reconfigurable processors and, more specifically, to a combination of clustered very large instruction word and runtime reconfigurable architectures that provides performance, in terms of power dissipation and processing speed, comparable to hardwired accelerators on a programmable platform.

BACKGROUND OF THE INVENTION

Clustered very large instruction word (VLIW) processors and runtime reconfigurable fabrics such as field programmable gate arrays (FPGAs) are all geared toward efficiently executing programs with high instruction level parallelism (ILP), typically loops in streaming application (video, audio, modulation, channel coding, encryption, etc.). Embedded multimedia applications, for instance, exhibit high ILP—as much as 10 to 100 instructions per cycle—in a small fraction of the total program code, often quoted as 10-20%, and low ILP—about 2—in the rest of the program, the remaining 80-90%. However, on a conventional processor, the high ILP portion of the program code (e.g., the loops) will consume a high fraction of the total execution time, reportedly 80-90%.

VLIW and superscalar architectures, which can issue several instructions simultaneously or for concurrent execution, have been proposed to accelerate code with high ILP. As the issue width increases, mounting design constraints—primarily related to timing—on the register file have led to clustered architectures where the registers are split among several physically distinct files around which execution units are clustered. An inter-cluster bus is also added to enable data transfer between register files.

In general purpose clustered architectures, however, significant silicon overhead and performance penalty is incurred by the inter-cluster bus necessary for transferring data between register files. Additionally, for VLIW architectures that are statically scheduled, program size overhead is also incurred due to the addition of send/receive instructions to transfer data between register files.

In practice, therefore, the inter-cluster bus overhead effectively limits the number of clusters to about four. Assuming each cluster has an issue width of four instructions, the maximum issue width of this architecture is sixteen, a typical upper limit for clustered VLIW machines. In addition, even more so than other programmable processors, clustered VLIW architectures incur a significant power dissipation penalty compared to a fixed hardware implementation because of the inter-cluster bus and because of the unused clusters when the ILP of the program code is too small. In fact, for the archetypical multimedia embedded program, a clustered architecture arguably has too little parallelism for the high ILP sections of the code and too much for the remainder of the code.

Another approach to accelerating ILP rich programs, mostly pursued in academia, is the use of a coprocessor using reconfigurable logic and a reconfigurable interconnect. However, this approach has its own problems. So-called Runtime Reconfigurable CoProcessors (RRCPs) based on a Field Programmable Gate Array (FPGA) or similar fabric have limitations due to poor programming abstraction, which makes them difficult to program and non-scalable. The poor scalability stems from the fact that these architectures typically have global routing resources. As the size of the coprocessor increases, the timing along the global routing limits the speed of the coprocessor, not unlike the inter-cluster bus for clustered architectures.

The poor programming model is a consequence of the absence of virtualization of the computing resources. This refers to the number of computing resources (arithmetic logic units, multipliers, etc.) that are typically visible in the programming abstraction. The consequence is that a program segment requiring more resources than are available cannot be accelerated on the RRCP. In addition, reconfiguration phases also generally show up in the programming model, adding to the complexity of the programming model.

Additional drawbacks of RRCPs include the significant amount of time taken by reconfiguration, the amount of resources dedicated to reconfiguration (such as a reconfiguration bitstream cache), the use of Register Transfer Level (RTL) or dedicated languages to program reconfiguration resources, and the area required and performance penalty incurred by reconfigurable logic. Various projects in academia, and some commercial offerings, have proposed partial solutions to the above limitations, but none have addressed all of the problems together.

There is, therefore, a need in the art for a general purpose programmable architecture that can dynamically allocate an adequate amount of computing resources based upon the amount of ILP within a program segment being executed for both performance and power dissipation—that is, to execute high ILP kernels very fast while executing low ILP program segments very power efficiently. There is further a need for a coprocessor architecture that can offer the performance of hardwired or reconfigurable logic while providing the familiar abstraction and scalability of a general-purpose processor.

SUMMARY OF THE INVENTION

To address the above-discussed deficiencies of the prior art, it is a primary object of the present invention to provide, for use in a processing system, clustered VLIW processing elements, each preferably simple and identical, coupled by a runtime reconfigurable inter-cluster interconnect to form a coprocessor executing only those portions of a program having high instruction level parallelism. The initial portion of each program segment executed by the coprocessor reconfigures the interconnect, if necessary, or is skipped. Clusters may be directly connected to a subset of neighboring clusters, or indirectly connected to any other cluster, a hierarchy exposed to the programming model and enabling a larger number of clusters to be employed. The coprocessor is idled during remaining portions of the program to reduce power dissipation.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
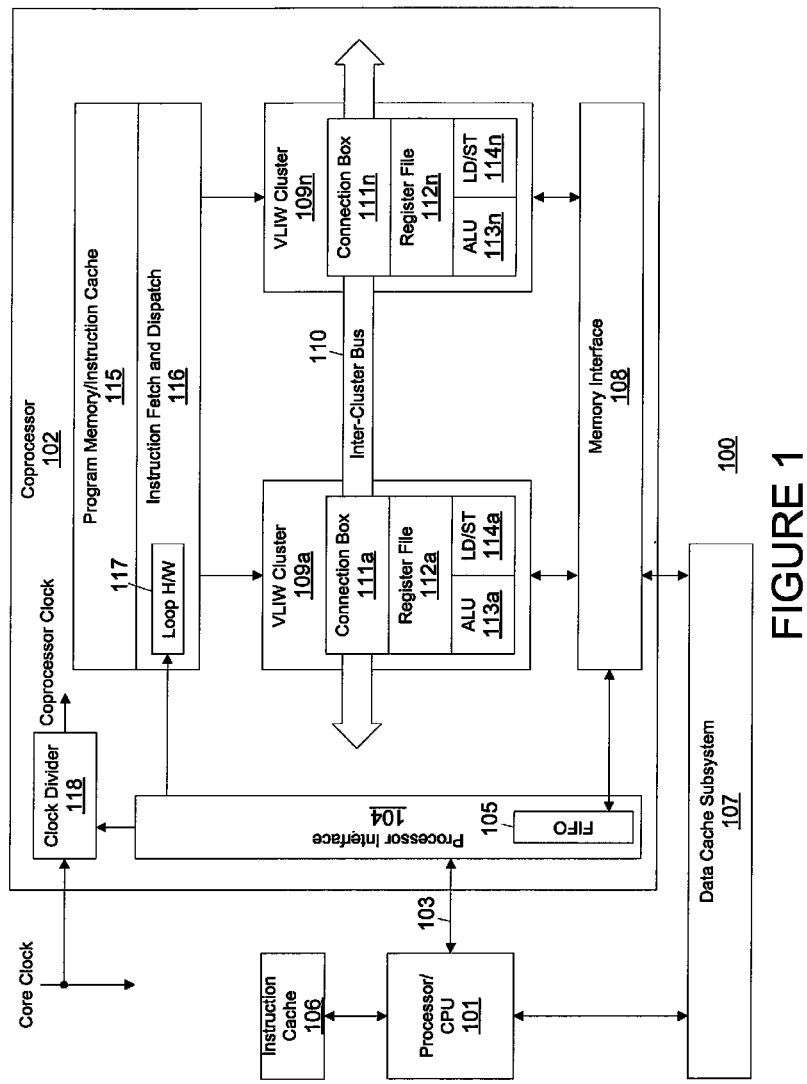
FIG. 1 depicts a processing system employing a clustered VLIW architecture with a runtime reconfigurable inter-cluster bus according to one embodiment of the present invention.

FIG. 1 depicts a processing system employing a clustered VLIW architecture with a runtime reconfigurable inter-cluster bus according to one embodiment of the present invention. Processing system 100 in the exemplary embodiment executes a program and includes a general-purpose processor or central processing unit (CPU) 101 communicably coupled to a coprocessor 102 via communication mechanism 103—e.g., a set of signal lines between processor 101 and a processor interface 104 within coprocessor 102. As described in further detail below, processor 101 transmits instructions and operand data to the coprocessor 102 via communication mechanism 103 for execution by the coprocessor 102, and receives (or retrieves) results of such instructions from the coprocessor 102. In a preferred embodiment, processor interface 104 includes a first-in, first-out (FIFO) mechanism 105 used to transfer data between processor 101 and coprocessor 102 and allowing simultaneous and asynchronous operation as described in further detail below in connection with FIG. 6.

In the exemplary embodiment, processing system 100 includes an instruction cache 106 and a data cache subsystem 107. Although depicted as separate from processor core 101, one or both of instruction cache 106 and data cache subsystem 107 may be fully integrated with processor core 101, and both are preferably at least formed within the same integrated circuit die as processor core 101.

A memory interface 108 within coprocessor 102 is connected to data cache subsystem 107, where processor 101 and coprocessor 102 share access to data cache subsystem 107 in the exemplary embodiment of FIG. 1. Processor 101 and coprocessor 102 preferably implement means to guarantee data consistency during program execution.

Coprocessor 102 includes a plurality of VLIW execution clusters 109a-109n executing computational and data intensive loops in the application code for the program executed by the processing system 100. Clusters 109a-109n are coupled by a runtime reconfigurable bus or interconnect 110, forming a fabric of programmable computing elements and a runtime reconfigurable interconnect. Coprocessor 102 is particularly adept at executing software pipelined loops.

One distinct feature of each cluster 109a-109n is a "connection box" execution unit 111a-111n therein, serving as an interface between the respective cluster 109a-109n and interconnect 110 and executing reconfiguration instructions. In particular, each connection box 111a-111n connects a number of read and write ports of the cluster's register file 112a-112n to a number of routing resources provided by reconfigurable inter-cluster bus 110, as described in further detail below in connection with FIG. 4. In the exemplary embodiment, each cluster register file 112a-112n has two write ports and two read ports connected to inter-cluster bus 110. Each cluster 109a-109n also includes an arithmetic logic unit (ALU) 113a-113n and a load/store (LD/ST) unit 114a-114n for issuing memory accesses. Memory access instructions issued by clusters 109a-109n are collected and prioritized by memory interface 108.

Processor 101 and coprocessor 102 have distinct program memory subsystems, with processor (core) 101 having a traditional instruction cache 106 as noted above while coprocessor 102 has a separate very wide program memory or instruction cache 115.

Coprocessor 102 also includes an instruction fetch and dispatch unit 116 retrieving instructions from coprocessor program memory 115 and dispatching them to clusters 109a-109n for execution. Since coprocessor 102 is specialized to execute loops, loop control hardware 117 is included within the instruction fetch and dispatch unit 116 of coprocessor 102 to reduce the number of conditional branches executed in the loop body, possibly to zero, thus improving performance by removing latencies typically associated with taken branches. Loop control hardware 117 is initialized prior to loop execution in accordance with techniques well-known in digital signal processing (DSP) architectures.

In the exemplary embodiment of FIG. 1, a clock divider 118 for coprocessor 102 derives the coprocessor clock from the core clock driving the remainder of processing system 100. The coprocessor clock generated by clock divider 118 is controller by processor 101 (through processor interface 104) as described in copending U.S. patent application Ser. No. 10/284,006 entitled "METHOD AND APPARATUS TO ADAPT THE CLOCK RATE OF A PROGRAMMABLE COPROCESSOR FOR OPTIMAL PERFORMANCE AND POWER DISSIPATION".

Figure 2:
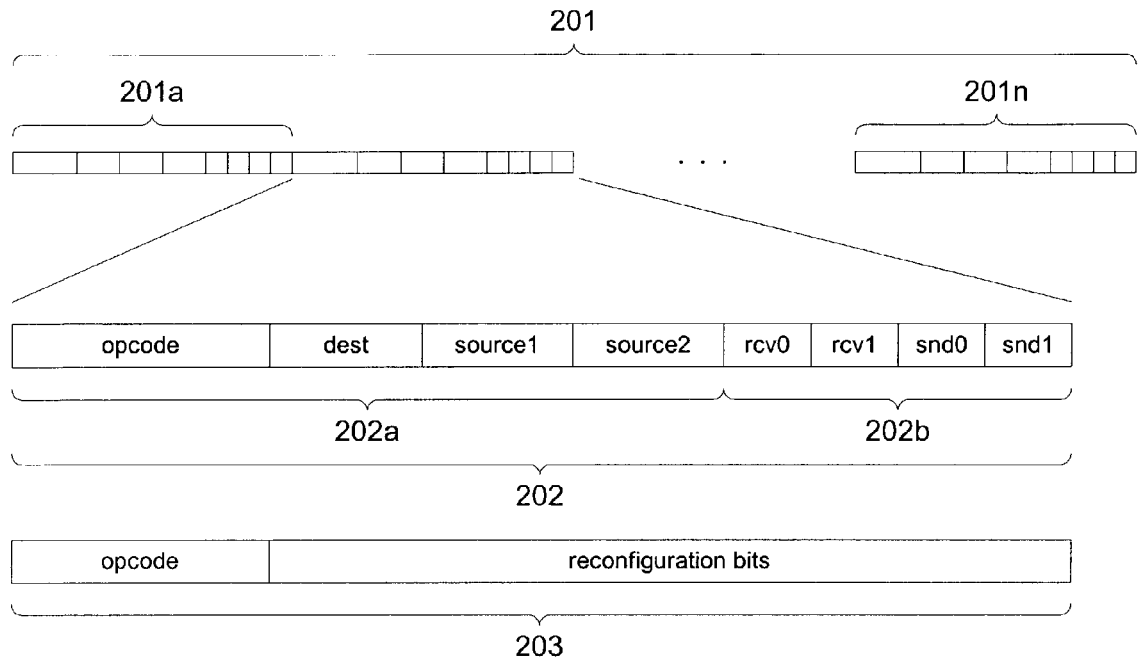
FIG. 2 depicts a generic instruction format for a coprocessor including a clustered VLIW architecture and a runtime reconfigurable inter-cluster bus according to one embodiment of the present invention.

FIG. 2 depicts a generic instruction format for a coprocessor including a clustered VLIW architecture and a runtime reconfigurable inter-cluster bus according to one embodiment of the present invention. Instruction 201, issued by instruction fetch and dispatch unit 116 to clusters 109a-109n within coprocessor 102, includes a plurality of syllables 201a-201n, each syllable 201a-201n being decoded and executed by one cluster 109a-109n. The number of syllables 210a-201n within instruction 201 equals the number of clusters 109a-109n within coprocessor 102. For the purposes of this description, each cluster is assumed to have an internal instruction issue width (to a respective ALU 113a-113n) of one, although wider issues are possible as in any clustered VLIW system.

Two types of syllables 202 and 203 are supported in the present invention. A first syllable type 202 directs the operation of traditional execution units, such as an ALU 113a-113n, contained in the cluster 109a-109n. A second syllable type 203, specific to the present invention, is a reconfiguration syllable directing operation of the connection box execution unit 111a-111n within the cluster 109a-109n. Syllables of the first type 202 is used inside the body of a loop executed on coprocessor 102, while reconfiguration syllables 203 are typically executed prior to a loop body to reconfigure the inter-cluster bus 110 (but may also be executed during a loop to dynamically reconfigure the inter-cluster bus 110).

Syllable 202 has two parts: a first part 202a is a conventional Reduced Instruction Set Computing (RISC) type ALU instruction, and a second part 202b is an inter-cluster bus instruction directing the transmission of data over the inter-cluster bus 110. The first part 202a of syllable format 202 includes an operation code (opcode) identifying the computation to be performed, a destination register address (dest), a first source operand register address (source1) and a second source operand address (source2).

For each write port of a cluster register file 112a-112n (two in the exemplary embodiment) connected to the inter-cluster bus 110, the syllable 202 includes within the second part 202b one "receive" bit rcv0, rcv1 to indicate whether data should be written into the respective register file 112a-112n from the inter-cluster bus 110. The register file address at which the data is written is defined once with a reconfiguration instruction 203 prior to the loop execution, and is not required to be explicitly defined during the loop execution.

For each read port of a cluster register file 112a-112n (also two in the exemplary embodiment) connected to the inter-cluster bus 110, the syllable 202 includes within the second part 202b one "send" bit snd0, snd1 to indicate whether data should be read from the respective register file 112a-112n onto the inter-cluster bus 110. Again, the register file address at which the data is read is defined once with a reconfiguration instruction 203 prior to the loop execution, and is not required to be explicitly defined during the loop execution. It should be noted that the send bits are not strictly required since a read may be performed at every cycle instead. However, the availability of send bits offers an opportunity to reduce power dissipation by performing read operations only when required, and are therefore preferably included.

The format of reconfiguration syllable 203 does not include the inter-cluster bus instruction since no inter-cluster data traffic should occur during reconfiguration. Syllable 203 is composed of an opcode and an immediate field of reconfiguration bits encoding the reconfiguration. The exact format of the reconfiguration field will depend on the topology of the inter-cluster bus 110.

Figure 3:
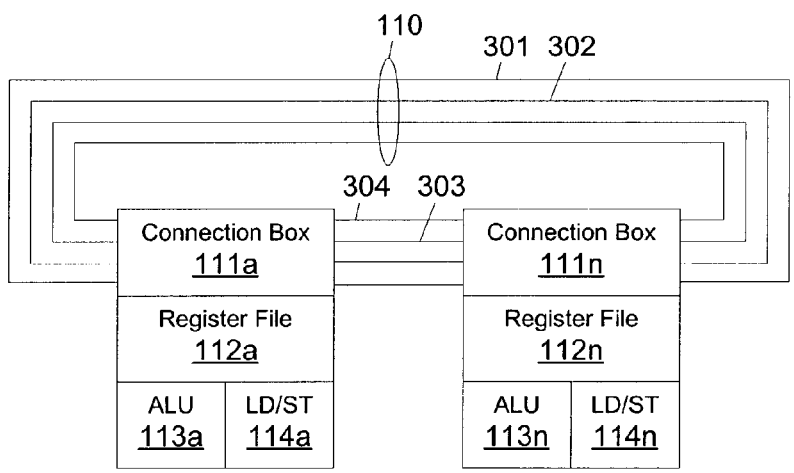
FIG. 3 depicts a suitable topology for an inter-cluster bus within a coprocessor including a clustered VLIW architecture and a runtime reconfigurable inter-cluster bus according to one embodiment of the present invention.

FIG. 3 depicts a suitable topology for an inter-cluster bus within a coprocessor including a clustered VLIW architecture and a runtime reconfigurable inter-cluster bus according to one embodiment of the present invention. In the implementation depicted, inter-cluster bus 110 is composed of four machine word-size buses 301-304 arranged together with the connection boxes 111a-111n in ring fashion. Each connection box 111a-111n physically connects a number of read and write ports (not shown) of the corresponding register file 112a-112n to the buses 301-304 within the inter-cluster bus 110. In the embodiment shown, two read ports and two write ports for each register file 112a-112n are connected in this manner, with the end result being that registers in different clusters are connected together. Although the embodiment shown allows any two cluster to be connected, in practice clusters further away than a predetermined distance should not be connected together in order to meet timing requirements. The maximum distance for connecting register files of two clusters will vary with the frequency of the clock generated by clock divider 118.

Figure 4:
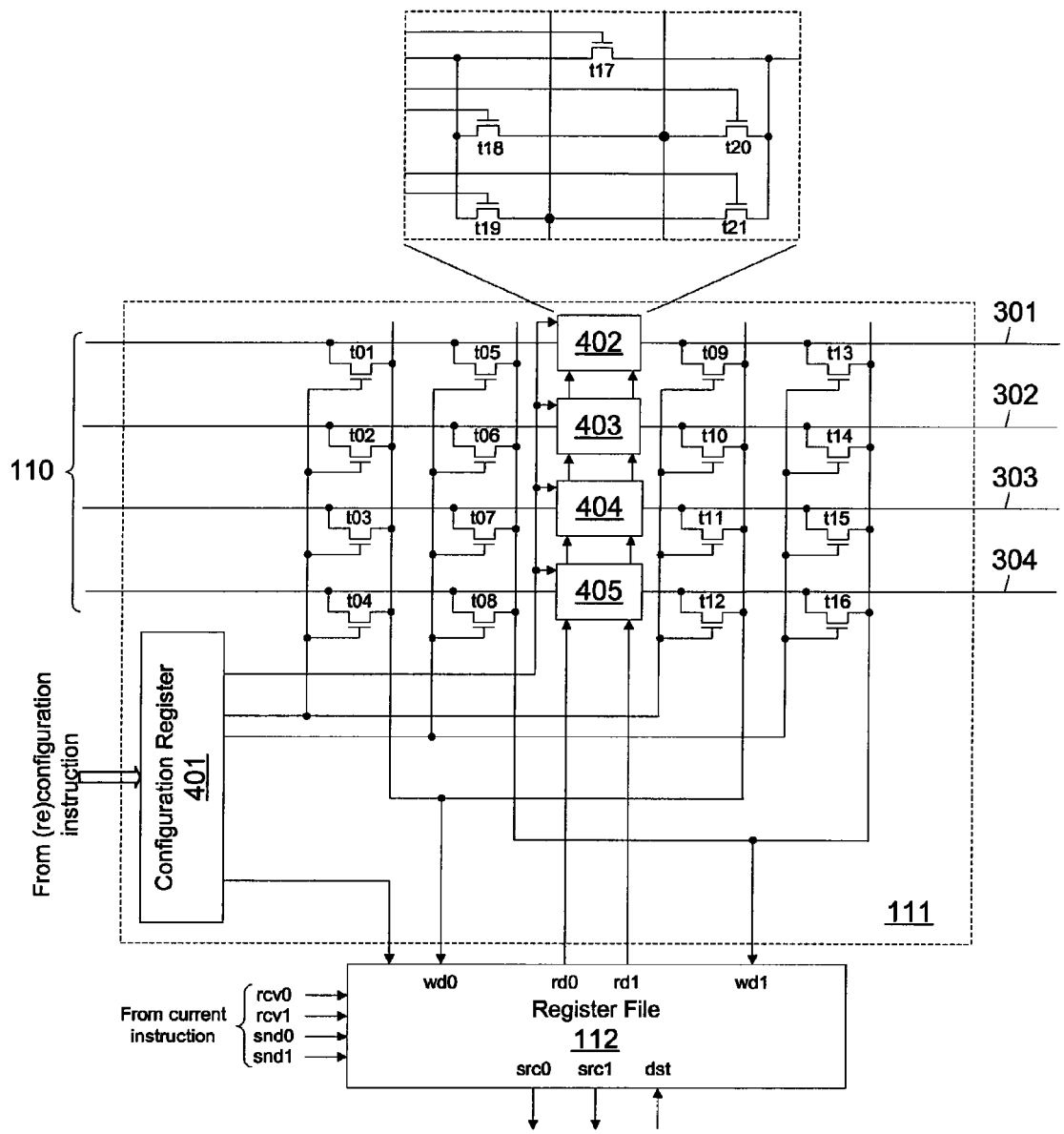
FIG. 4 depicts a connection box for an inter-cluster bus within a coprocessor including a clustered VLIW architecture and a runtime reconfigurable inter-cluster bus according to one embodiment of the present invention.

FIG. 4 depicts a connection box for an inter-cluster bus within a coprocessor including a clustered VLIW architecture and a runtime reconfigurable inter-cluster bus according to one embodiment of the present invention. The connection box ill physically connects the inter-cluster bus 110 to the cluster register file 112, controlling connection of the read ports rd0 and rd1 and the write ports wd0 and wd1 to the buses 301-304 based on a configuration register 401. Configuration register 401 is set by a configuration (or reconfiguration) instruction syllable 203.

In the example shown, connection box 111 sees the inter-cluster bus 110 in two parts: one connection to clusters further along the inter-cluster bus 110 on one side of the respective cluster, and one connection to clusters further along the inter-cluster bus 110 on the other side. Each write port wd0 and wd1 may be connected to any of buses 301-304 on either part of the inter-cluster bus 110, reading data emanating from a cluster to either side of the current cluster. Pass gates t01-t04 connect write port wd0 to buses 301-304 on one side, while pass gates t09-t12 connect write port wd0 to buses 301-304 on the other side. Pass gates t05-t08 connect write port wd1 to buses 301-304 on one side, while pass gates t13-t16 connect write port wd1 to buses 301-304 on the other side.

Similarly, each read port rd0 and rd1 can be connected to either part of the inter-cluster bus 110, writing data to a cluster situated on either side of the current cluster. Pass gate t19 within each of blocks 402-405 connects read port rd0 to a respective one of buses 301-304 on one side, while pass gate t21 within each of blocks 402-405 connects read port rd0 to a respective one of buses 301-304 on the other side. Pass gate t18 within each of blocks 402-405 connects read port rd1 to a respective one of buses 301-304 on one side, while pass gate t20 within each of blocks 402-405 connects read port rd1 to a respective one of buses 301-304 on the other side. Additionally, the connection box 111 may be configured as a pass through for the inter-cluster bus 110, meaning that a bus 301-304 from one side of the current cluster may be connected to the corresponding bus on the other side (by pass gate t17 within each of blocks 402-405). Every combination of bus connections is also possible, although the compiler should be careful to avoid illegal combinations such as two drivers writing on the same physical bus.

Those skilled in the relevant art will recognize that the term "connection box," borrowed from the glossary of FPGA technology, is employed herein to refer to a mix of the FPGA connection box and the FPGA "switch box."

Figure 5:
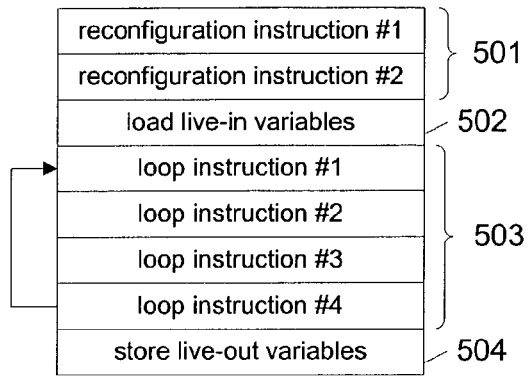
FIG. 5 depicts a typical program loop executed on a coprocessor including a clustered VLIW architecture and a runtime reconfigurable inter-cluster bus according to one embodiment of the present invention.

FIG. 5 depicts a typical program loop executed on a coprocessor including a clustered VLIW architecture and a runtime reconfigurable inter-cluster bus according to one embodiment of the present invention. Each instruction depicted is equivalent to an instruction syllable 202 or 203 depicted in FIG. 2. When the program segment depicted is invoked, the first few instructions 501 configure the connection boxes 111. The exact number of instructions required to reconfigure the inter-cluster bus 110 depends on the architectural parameters, such as the number of machine word-size buses within the inter-cluster bus 110 (although that number of instructions is generally small, typically less than 4, since reconfigurable features are kept to a minimum and the instruction is very wide).

After reconfiguration, live-in variables are loaded into registers of the various clusters by one or more instruction(s) 502. Live-in variables are those variables defined in the program prior to the loop and used during loop execution, communicated from processor 101 through communication mechanism 103. In the case that at most one live-in variable is required in any cluster, assuming as stated above that each cluster has an instruction issue width of one, only one instruction is required to load all live-in variables in coprocessor 102. If one cluster requires more than one live-in variable, more instructions may be required to load all necessary live-in variables.

After the live-in variables are loaded, the loop body instructions 503 are executed. In a preferred embodiment, the instruction fetch logic of coprocessor 102 includes hardware loop support that reduces conditional branches in the code and minimizes branching overhead during execution.

When the loop execution is complete, live-out variables (variables modified during loop execution and needed later in the program) are communicated to the processor by one or more instruction(s) 504 in a manner similar to the loading of live-in variables.

Figure 6:
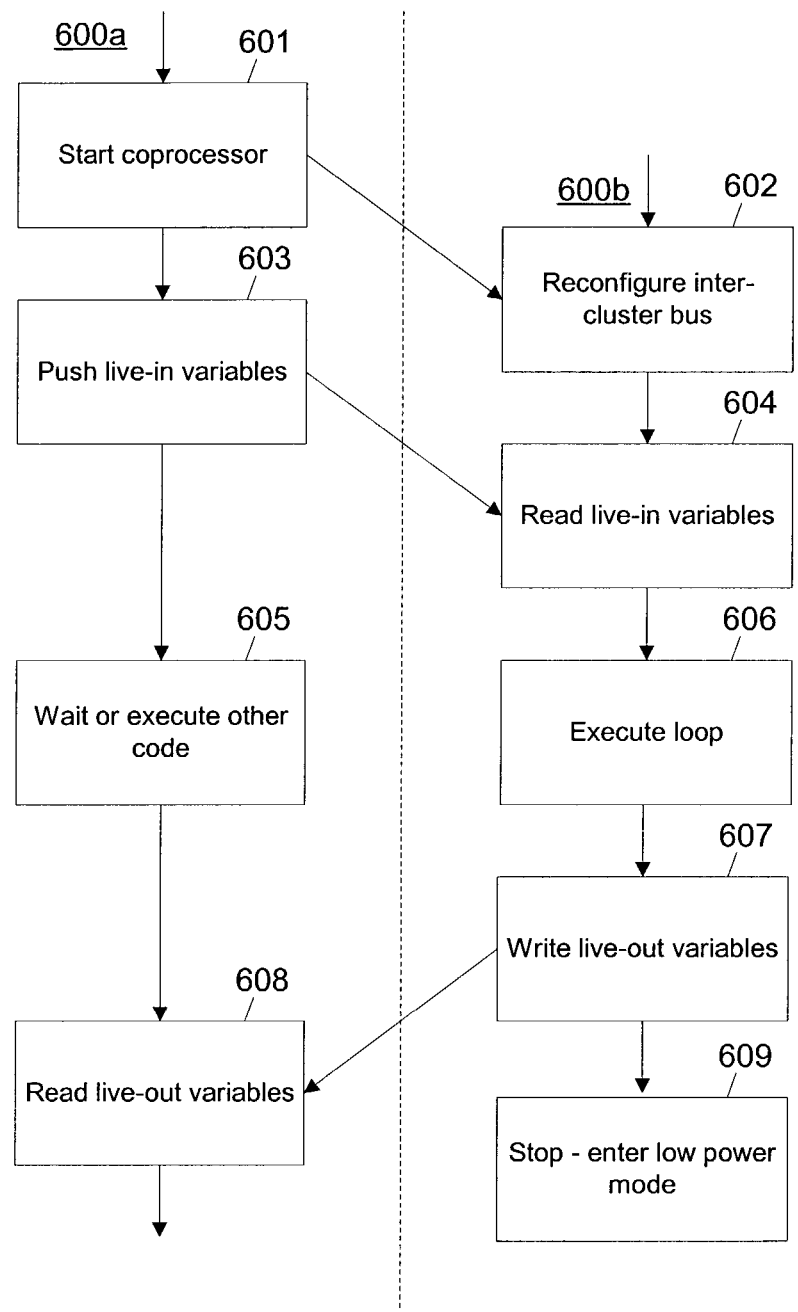
FIG. 6 is a portion of a high level flow chart illustrating execution of a program within a processing system including a processor and a coprocessor including a clustered VLIW architecture and a runtime reconfigurable inter-cluster bus according to one embodiment of the present invention.

FIG. 6 is a portion of a high level flow chart illustrating execution of a program within a processing system including a processor and a coprocessor including a clustered VLIW architecture and a runtime reconfigurable inter-cluster bus according to one embodiment of the present invention. FIG. 6 depicts the interaction between processor 101 and coprocessor 102, placing the program illustrated in FIG. 5 within a larger context. Processor 101 and coprocessor 103 are assumed to communicate through a hardware FIFO mechanism ensuring that communication between the two components is regulated by hardware interlocks and need not be regulated by software. In an alternate embodiment, the communication might be effected through a dedicated memory space or stack, in which case software polling is required to ensure that each interlocutor is ready before communication is effected.

When the program flow 600a executed on processor 101 arrives at a point at which a loop needs to be executed on coprocessor 102, processor 101 communicates to coprocessor 102 which loop needs to be executed next (step 601). The loop is uniquely identified and characterized by processor 101 so that coprocessor 102 knows which program address (or address range) to fetch and execute. Those skilled in the art will recognize that several self-evident methods exist to perform this function, which is not described in detail herein.

While the coprocessor 102 fetches the first instructions and executes the reconfiguration portion of the program flow 600b executed on the coprocessor (step 602), the processor 101 communicates the live-in variables to the coprocessor 102 (step 603). Because a hardware FIFO mechanism is assumed, the process of communicating the live-in variables may overlap reconfiguration of the inter-cluster bus 110 and reading the live-in variables within the coprocessor 102. If the FIFO becomes full during communication of the live-in variables, the hardware mechanism will stall the processor 101; if the FIFO becomes empty before communication of the live-in variables is completed, coprocessor 102 will stall.

While the loop is executed on coprocessor 102 (step 606), processor 101 can simply wait, but is also available to perform other tasks (step 605). When the loop terminates, coprocessor 102 writes the live-out variables to processor 101 (step 607) and processor 101 reads the live-out variables (step 608). Means are provided to processor 101 to poll the status of coprocessor 102, to determine which phase of loop execution the coprocessor 102 is currently processing. This feature is useful, for example, to decide when processor 101 should exit from waiting or execution of other code (step 605), or to determine when loop execution is terminated on the coprocessor 102 if the loop has no live-out variables.

When all live-out variables are written, coprocessor 102 typically enters a low power mode (step 609), so that processing system 100 adapts its power dissipation profile to the amount of parallelism available within the program segment being executed.

The process described above is similar to a function call, except that the state of processor 101 need not be saved prior to the function call.

Figures 7A, 7B, 7C:
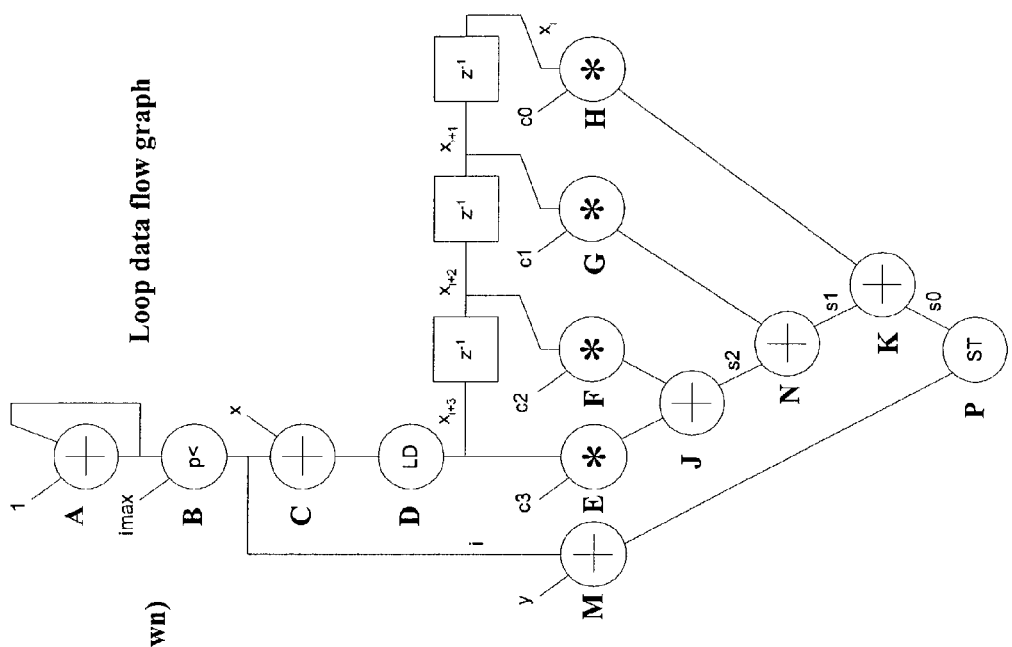
FIGS. 7A-7C illustrate a loop that may be scheduled for execution within a processing system including a processor and a coprocessor including a clustered VLIW architecture and a runtime reconfigurable inter-cluster bus according to one embodiment of the present invention.

FIGS. 7A through 7C illustrate a loop that may be scheduled for execution within a processing system including a processor and a coprocessor including a clustered VLIW architecture and a runtime reconfigurable inter-cluster bus according to one embodiment of the present invention. Three versions of an exemplary loop implementing a 4-tap filter, where FIG. 7A is the original C code, FIG. 7B is a pseudo-assembler version of the same code after two transformations have been applied, and FIG. 7C is the Data Flow Graph (DFG) equivalent to the pseudo-assembler code in FIG. 7B.

As noted, FIG. 7B is a pseudo-assembler version of the code segment in FIG. 7A after two transformations have been applied. The first transformation is load elimination, which basically promotes the use of registers (here denoted $x_{i+1}$, $x_{i+2}$ and $x_{i+3}$) to store successive values of array x. the net effect is that only one load operation is required per iteration instead of the four operations required in the original C code. The second transformation is predication of the loop body to enable software pipelining with kernel-only scheduling. Operand predication, as described in copending U.S. patent application Ser. No. 10/283,709 entitled "PREDICATED EXECUTION USING OPERAND PREDICATES", with a predicate bit being associated with each live variable and instructions being predicated by the logical AND of all operand predicates. This form of predication is effective for kernel-only scheduling in software pipelining. Since all instructions in the loop body are directly or indirectly dependant on the induction variable (i) of the loop, that variable is employed as iteration predicate, which is the purpose of the instruction "i.p=(i<imax)" in FIG. 7B. The predicate associated with the variable i is set to the loop continue condition.

Figure 8:
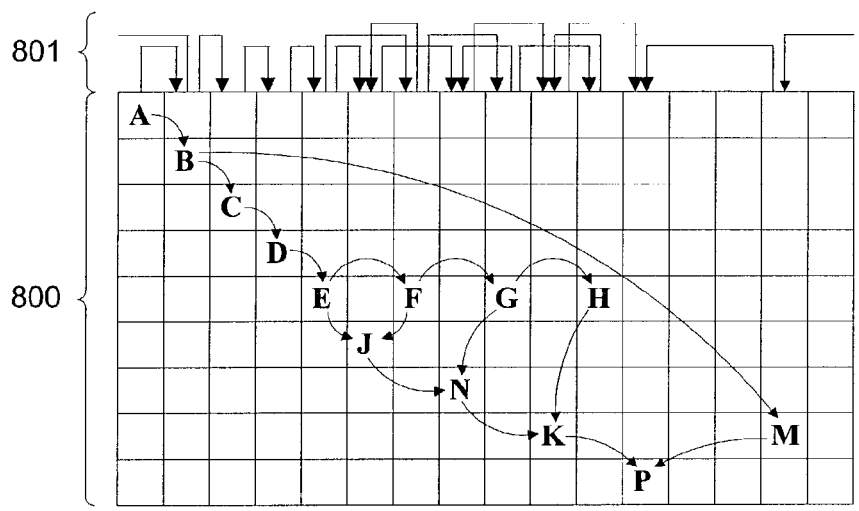
FIG. 8 represents the modulo reservation table used by a compiler for scheduling the loop of FIGS. 7A-7C for execution within a processing system including a processor and a coprocessor including a clustered VLIW architecture and a runtime reconfigurable inter-cluster bus according to one embodiment of the present invention.

FIG. 8 represents a modulo reservation table used by a compiler for scheduling the loop of FIGS. 7A-7C for execution within a processing system including a processor and a coprocessor including a clustered VLIW architecture and a runtime reconfigurable inter-cluster bus according to one embodiment of the present invention. Modulo reservation table (MRT) 800 is employed for scheduling the DFG depicted in FIG. 7C on a 16-cluster coprocessor 102. Because there are 16 one-issued clusters, the MRT 800 has sixteen columns, one for each cluster, while rows in the table represent time. As may be expected with an MRT, table 800 is employed to book computing resources in the clusters during scheduling of the DFG depicted in FIG. 7C.

Table 800 is also employed to book communication resources in the inter-cluster bus 110, with all machine word-size buses within the inter-cluster bus 110 represented by a horizontal dotted lines 801 above MRT 800 that are used to book sections of the inter-cluster bus 110 during scheduling. The final schedule of the DFG depicted in FIG. 7C, including the booking of computing and routing resources, is illustrated in FIG. 8, where the booking process is described in greater detail below.

Figure 9:
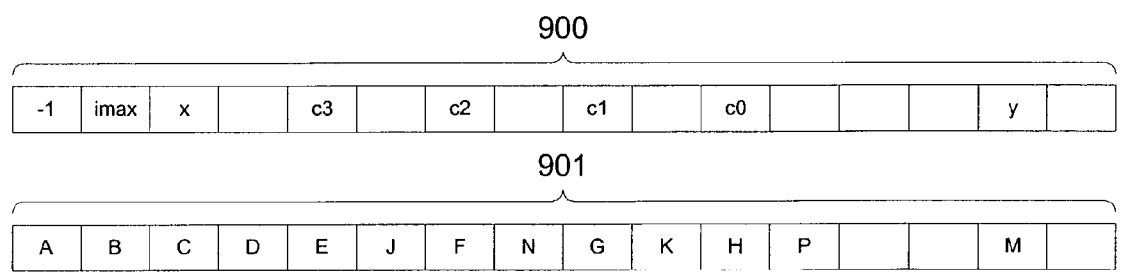
FIG. 9 depicts two instructions generated from the final schedule obtained utilizing the modulo reservation table of FIG. 8 to schedule the loop of FIGS. 7A-7C for execution within a processing system including a processor and a coprocessor including a clustered VLIW architecture and a runtime reconfigurable inter-cluster bus according to one embodiment of the present invention.

FIG. 9 depicts two instructions generated from the final schedule obtained utilizing the modulo reservation table of FIG. 8 to schedule the loop of FIGS. 7A-7C for execution within a processing system including a processor and a coprocessor including a clustered VLIW architecture and a runtime reconfigurable inter-cluster bus according to one embodiment of the present invention. The first instruction 900 is an initialization instruction 502, showing which live-in variables are written to which cluster before loop execution begins. The second instruction 901 is a loop body instruction 503, where the loop body in this case requires only just one instruction since the loop was successfully scheduled with an initiation interval (II) of one.

Referring to FIGS. 1 through 9 together, the structure and operation of a processing system including a processor and a coprocessor including a clustered VLIW architecture and a runtime reconfigurable inter-cluster bus according to one embodiment of the present invention is described in greater detail, together with variations on the preferred embodiment.

Cluster 109n is one of the VLIW clusters within processing system 100. The number of clusters within processing system 100 is a parameter of the architecture 100, but will typically be very high (e.g., sixty-four). In a preferred embodiment, all clusters 109a-109n are identical and very simple, issuing one instruction per cycle and including a small register file of registers 112 (for example, eight registers).

All clusters 109a-109n can issue memory instructions, known as load and store instructions, which is required to be able to initialize live-in variables into, and retrieve live-out variables out of, any cluster. Support for memory instructions within each cluster also simplifies a compiler's job of scheduling instructions on the coprocessor 102. However, architecturally there need not be as many ports to memory as there are clusters (the number of memory ports is a parameter of the architecture determined for each implementation) since memory interface 108 is tasked with gathering and prioritizing all memory access requests issued by the clusters 109a-109n. If more memory access requests are made during any cycle than can be accommodated, the coprocessor 102 is stalled until all requests are satisfied.

The inter-cluster bus 110 may be configured before the program starts or may dynamically change configuration at any cycle during program execution through specific instructions. The inter-cluster bus 110 is hierarchical, meaning that a cluster may be physically connected to a subset of close neighbors and indirectly connected (i.e., through two or more physical connections or hops) to the other clusters. This hierarchy is exposed in the programming model, in opposition to traditional clustered processor architectures, and is the enabling factor in effectively increasing the number of clusters that may be effectively implemented.

The precise topology and exact latency of inter-cluster bus 110 is a parameter determined for each implementation by a compromise between semiconductor area, speed and ease of programming. Unlike FPGAs and other existing reconfigurable architectures, however, connections over the inter-cluster bus should have a predictable propagation timing, one reason why, as stated above, direct physical connections between clusters are limited to neighbors. However, in the embodiment described herein, it should be noted that nothing prevents connection of any two clusters together. The compiler is tasked with the job of ensuring that the maximum distance between two connected clusters is not violated.

Moreover, this maximum distance is a function of the coprocessor clock frequency, also under control of the compiler in the preferred embodiment. The greater the distance between clusters, the easier for the compiler to schedule instructions on the coprocessor, giving the compiler more latitude to obtain the most performance out of the architecture. With conventional architectures, if a loop pipelining schedule attempt fails for a given II, the only option is to increase the II and attempt a new schedule. In this embodiment, however, the compiler has another option besides increasing the II, which is to keep the same II while reducing clock speed and increasing the maximum distance between two connected clusters. Both options reduce performance, but the second option possibly less than the first. Therefore, the compiler can optimize performance on a loop-by-loop basis. The same reasoning may be followed for power dissipation: less critical loops may be schedule with a lower clock frequency, but the resulting longer maximum distance between directly connected clusters enables more aggressive schedule and will mitigate performance loss.

A connection over the inter-cluster bus 110 will physically connect a source register from one cluster to any of a number of destination registers in any of a number of clusters. The addresses of the source and destination registers are determined during a reconfiguration and remain constant until the next reconfiguration. Typically, during loop execution, no reconfiguration occurs, and data is transferred from the source register to the destination register each time the relevant "receive" and "send" bits in instruction 201 are true, without the need to specify register addresses.

The exemplary embodiment employs pass transistors for implementation of the connection box 111, which is the most efficient implementation in terms of silicon area. Other implementations using active gates will exhibit better propagation timing at the expense of more silicon real estate.

Even though the combination of VLIW clusters 109a-109n and the runtime reconfigurable inter-cluster bus 110 form a general-purpose architecture, this architecture is most efficient when closely coupled as part of a coprocessor 102 to a more traditional general-purpose processor 101, with the execution model that the coprocessor 102 executes only the parts of the program with a very high ILP, generally loops. The coprocessor 102 may be idled during other portions of the code to reduce power dissipation.

During operation, the inter-cluster bus 110 is first reconfigured to form an application-specific interconnect. The reconfiguration bitstream is simply viewed as the first part of the program running on the coprocessor 102, and resides in the coprocessor instruction cache or program memory. If the reconfiguration bitstream is not present in the instruction cache, the initial reconfiguration operation is treated as an instruction cache miss. In this perspective, reconfiguration is treated like a particular program phase and does not require a modification of the traditional computing model or specific hardware support such as a configuration cache. Also, the very wide instruction format and the limited number of reconfigurable features for the architecture allows for an extremely fast reconfiguration. These two properties distinguish the present invention from virtually all other existing or proposed reconfigurable architectures.

Following, or possibly simultaneously with, the interconnect reconfiguration, live-in variables are written to the appropriate registers within cluster 109a-109n. These registers may be memory mapped into the address space for processor 101, but such mapping would render the program running on the processing system 100 dependent on the coprocessor implementation. To avoid this, a first in, first out (FIFO) or stack mechanism 105 may be employed. In this case, processor-side initialization code writes the live-in variables in the FIFO or stack 105, which the runtime reconfigurable coprocessor side reads. A hardware FIFO 105 will allow the two initialization programs to run simultaneously, stalling either the processor 101 or the coprocessor 102 if the FIFO 105 becomes full or empty. Execution begins as soon as the configuration and initialization are complete and the first loop instruction is available.

Referring to the flow charts of FIG. 6, the processes illustrated are executed on a clustered VLIW coprocessor with an inter-cluster bus that may be configured to be application-specific at runtime, and assume that a hardware FIFO is used to transfer data between the processor and coprocessor since that is the most efficient mechanism. The FIFO is memory mapped for both the processor and the coprocessor. A software stack may alternatively be used, leading to some differences in protocol that are noted as necessary.

FIG. 6 illustrates execution of a data flow graph having no explicit flow control. In the simplest form, the sequence of operations 600a from the processor's perspective begins with the processor informing the coprocessor which program segment to execute (step 601) by means of a pointer to memory where the program segment is located.

Once reconfiguration of the coprocessor inter-cluster bus is sufficiently started or complete, the processor begins pushing live-in variables to the coprocessor (step 603). In the stack model, all live-in variables need to be pushed before the (first) coprocessor function call. Therefore, the FIFO model can be seen to be superior since a FIFO allows simultaneous instruction fetch by the coprocessor and live-in variable push by the processor. The compiler is then free to optionally schedule some code for execution by the processor (step 605) while reconfiguration of the inter-cluster bus is performed in the coprocessor.

The processor may have to wait a long time here, during which there is only so much code within the current thread that can be executed. Therefore, the operating system (OS) could switch to execution of another thread that would not use the coprocessor. Once the coprocessor has sufficiently completed execution of the designated program segment, the processor reads out the first live-out variable from the coprocessor (step 608), and if necessary stalls until that live-out variable value is available, which may not be before execution is entirely finished. In the stack model, the execution would have to be completed before the processor can read anything.

The processor then reads out the remaining live-out variables. The coprocessor is considered finished when the last live-out variable is read from the FIFO. There is no need for signaling completion, although if the program segment (loop) has no natural live-out variable, then one must be artificially created by the compiler. The processor 101 then proceeds with execution of the program.

In more complex situations where the coprocessor is executing a loop with multiple exits and/or excluded control paths, the processor will read an exit code emitted by the coprocessor identifying exit circumstances, and might execute code to finish the current iteration and/or restart the coprocessor to finish the loop. This mechanism allows execution of a larger class of loops in the coprocessor.

From the coprocessor's perspective, also illustrated by FIG. 6, the sequence of operations 600b begins upon receiving the call instruction from the processor (step 307). The first instruction of the corresponding program, which is a configuration instruction, is fetched unless the current configuration of the coprocessor is the desired configuration, in which case the configuration instructions are skipped.

The first instruction(s), as few as one, actually reconfigure the inter-cluster bus (step 602). The following few instructions, as many as the maximum live-in variables in a single cluster, typically one, read in the live-in variables (step 604). If the number of live-in variables simultaneously read exceeds the number of read ports, the coprocessor will stall until all values are available. Live-in variables are read from FIFO 105, which might be mapped to a single address in the coprocessor's address space. When several accesses to the same address occur in the same VLIW instruction 201, a priority order must be defined to guarantee a predictable and consistent program execution. For example, a left to right priority order can be defined, meaning that semantically, memory accesses in instruction 201 are executed in a left to right order. Such a scheme allows the compiler to fold all live-in variable read (and live-out variable write) operations in a few instructions 201. Without such a provision, the compiler would have to create one VLIW instruction 201 for each line-in and live-out variable.

Execution of the loop program segment proper is then begun (step 606), consisting of looping through the same sequence of instructions until an exit condition is generated by one of the clusters. The last few instructions (as many as the maximum number of live-out variables in a single cluster, typically one, write the live-out variables to the FIFO or stack (step 607). The execution is finished when the last live-out variable is written, at which time the coprocessor becomes idle (step 609). In the stack model, an additional signaling is required to signify the end of execution and the integrity of the stack.

The following description of scheduling the DFG depicted in FIG. 7C on a 16 one-issue cluster coprocessor 102 with a 4 machine word-size inter-cluster bus 110 as depicted in FIGS. 3 and 4 is based on scheduling constraints that: the inter-cluster bus latency is zero cycles (a simplifying assumption, but one which does not compromise generality of this example); and the maximum distance between two connected clusters is three, meaning that a cluster can be directly connected to the three neighbors to one side and the three neighbors to the other side.

Since the DFG is thirteen instructions and there are 16 clusters, the resource constrained II is one. Since there are no inter-iteration dependencies, the recurrence constrained II is zero. Those skilled in the art will recognize these terms and processes from modulo scheduling. Essentially, the conditions are met to attempt a modulo-schedule software pipelining of the loop in which a new iteration will be started every cycle.

In the MRT 800 shown in FIG. 8, the columns represent clusters and the rows represent what the respective clusters do over time. First, the scheduling of one loop iteration is attempted. If successful, the scheduling of the pipeline version of the loop is derived.

Instruction A from the DFG is scheduled on the cluster represented by column 1. Since a new iteration is started every cycle, this cluster will execute instruction A for every iteration and is therefore fully booked. Instruction B is scheduled on the cluster represented by column 2. Since there is a data dependence between instructions A and B (the result of A is used by B), B is scheduled one cycle later, and a portion of the inter-cluster bus is also booked as illustrated by the arrow above the first two columns. (The arrow between instructions A and B inside the MRT 800, and all other arrows between instructions inside the MRT 800, are for illustrative purposes only, depicting the DFG being scheduled, and are not part of the scheduling process.) Instruction C is then scheduled in a manner similar to instruction B, and so are the other instructions. Note that since the inter-cluster bus has a ring topology, the connection between instruction B and M (columns 2 and 15) is valid. Note also, in the case of the cluster executing instruction E, the manner in which the two read ports of every register file connected to the inter-cluster bus may be exploited: the result of instruction E is used by instruction J, and an inter-cluster bus resource is booked accordingly, but, in addition, the input to instruction E coming from instruction D is forwarded to instruction F, where that input is required a cycle later.

When the II is one, a connection between clusters will always be allocated to the same variable over time. The successive values of the variable across all iterations will be transferred over the connection. However, when the II is two or more, the same connection can be allocated to several variables, multiplexed in time. This is the case when one or more instructions executed in one cluster require several results from several instructions executed in another cluster. In this case, one physical connection will be required to transfer all of the variables over the II cycles of the final schedule. This characteristic guarantees the rapid convergence of an iterative modulo scheduling heuristic when the bottleneck is the inter-cluster bus; increasing the II, by increasing the amount of possible time-multiplexing on the connection resources, significantly relieves the pressure on the inter-cluster bus resources.

In the example of FIG. 8, scheduling with II=1 is successful, and a legal schedule for the pipelines execution of the loop is obtained by folding the MRT of FIG. 8 into II rows. These rows compose the loop body of the pipelined loop. Because of the use of predication, the same program is also used for the prologue and epilogue of the pipelined loop. In this case the loop body is only one instruction long as shown in FIG. 9, with the loop of FIG. 7A having been effectively vectorized. Also from MRT 800, which cluster requires which live-in variable is immediately apparent and live-in variable loading instruction 502 (instruction 900) may be generated.

The present invention provides an architecture of a runtime reconfigurable coprocessor providing performance comparable to hardwired accelerators (in both processing speed and power dissipation) on a programmable platform. Like a reconfigurable fabric, the present invention features a large number of processing elements and can execute programs with very high instruction level parallelism, matching dedicated hardware implementations. Like a VLIW processor, the present invention has an abstract programming model for general-purpose application, and making the architecture amenable to a high level compiler target. By implementing the VLIW processing elements and runtime reconfigurable inter-cluster interconnect as a coprocessor, the facilities may be idled when not needed to reduce power dissipation.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A portion of a processing system comprising:
a plurality of processing clusters each including a register file, an arithmetic logic unit, a load/store unit a plurality of write ports, a plurality of read ports and connection configuration logic;
a runtime reconfigurable interconnect coupling the plurality of processing clusters, wherein the runtime reconfigurable interconnect is selectively alterable to connect any first one of the processing clusters with any second one of the processing clusters using any portion of the runtime reconfigurable interconnect; and
an interface to a processor,
wherein the plurality of processing clusters and the runtime reconfigurable interconnect execute a program segment designated by the processor, the program segment including a configuration portion setting a configuration of the runtime reconfigurable interconnect, the configuration portion of the program segment including, for each write port of one of the processing clusters, a receive bit indicating whether data received data should be written to a corresponding register file address for a location within the register file and, for each read port of the one processing cluster, for each read port of the one processing cluster, a send bit indicating whether data should be read from a corresponding register file address for a location within the register file.

2. The portion of a processing system according to claim 1, wherein a programming model for the processing system exposes a hierarchy for connection of the plurality of processing clusters.

3. The portion of a processing system according to claim 1, wherein the plurality of processing clusters and the runtime reconfigurable interconnect employ a program instruction cache separate from a program instruction cache employed by the processor, the portion of a processing system further comprising:
a memory interface coupling the plurality of processing clusters and the runtime reconfigurable interconnect to a program data cache employed by the processor.

4. The portion of a processing system according to claim 3, wherein the interface to the processor includes a first-in, first-out mechanism for reading live-in variables from and writing live-out variables to the processor.

5. The portion of a processing system according to claim 1, wherein each cluster is coupled to the interconnect through a connection controller capable of selectively coupling any register within a register file at the respective cluster to any bus within the interconnect, wherein connection of registers to buses within the interconnect is controlled by a configuration register at the respective cluster written during the configuration portion.

6. The portion of a processing system according to claim 1, wherein the processing clusters and the runtime reconfigurable interconnect employ wide instructions, and wherein a number of features within the runtime reconfigurable interconnect that may be reconfigured is limited.

7. The portion of a processing system according to claim 1, wherein the processing clusters and the interconnect execute segments of a program for the processing system having high instruction level parallelism and idle during other segments of the program.

8. A processing system comprising:
a processor selectively executing a program when operable; and
a coprocessor selectively executing portions of the program designated by the processor when operable, the coprocessor comprising:
a plurality of processing clusters each including a register file, an arithmetic logic unit, a load/store unit, a plurality of write ports, a plurality of read ports, and connection configuration logic;
a runtime reconfigurable interconnect coupling the plurality of processing clusters, wherein the runtime reconfigurable interconnect is selectively alterable to connect any first one of the processing clusters with any second one of the processing clusters using any portion of the runtime reconfigurable interconnect; and
an interface to the processor,
wherein the program segment designated by the processor for execution by the coprocessor includes a configuration portion setting a configuration of the runtime reconfigurable interconnect, the configuration portion of the program segment including, for each write port of one of the processing clusters, a receive bit indicating whether data received data should be written to a corresponding register file address for a location within the register file and for each read port of the one processing cluster, for each read port of the one processing cluster, a send bit indicating whether data should be read from a corresponding resister file address for a location within the register file.

9. The processing system according to claim 8, wherein a programming model for the processing system exposes a hierarchy for connection of the plurality of processing clusters.

10. The processing system according to claim 8, wherein the coprocessor employs a program instruction cache separate from a program instruction cache employed by the processor, the processing system further comprising:
a memory interface coupling the coprocessor to a program data cache employed by the processor.

11. The processing system according to claim 10, wherein the interface to the processor within the coprocessor includes a first-in, first-out mechanism for reading live-in variables from and writing live-out variables to the processor.

12. The processing system according to claim 8, wherein each cluster is coupled to the interconnect through a connection controller capable of selectively coupling any register within a register file at the respective cluster to any bus within the interconnect, wherein connection of registers to buses within the interconnect is controlled by a configuration register at the respective cluster written during the configuration portion.

13. The processing system according to claim 8, wherein the processing clusters and the runtime reconfigurable interconnect employ wide instructions, and wherein a number of features within the runtime reconfigurable interconnect that may be reconfigured is limited.

14. The processing system according to claim 8, wherein the coprocessor executes segments of a program for the processing system having high instruction level parallelism and idles during other segments of the program.

15. A method of operating a processing system comprising:
coupling a plurality of processing clusters with a runtime reconfigurable interconnect, each including a register file, an arithmetic logic unit, a load/store unit, a plurality of write ports, a plurality of read ports, and connection configuration logic, wherein the runtime reconfigurable interconnect is selectively alterable to connect any first one of the processing clusters with any second one of the processing clusters using any portion of the runtime reconfigurable interconnect;
providing an interface to a processor for the processing clusters and the interconnect; and
executing a program segment designated by the processor using the processing clusters and the interconnect, the program segment including a configuration portion setting a configuration of the runtime reconfigurable interconnect, the configuration portion of the program segment including, for each write port of one of the processing clusters, a receive bit indicating whether data received data should be written to a corresponding register file address for a location within the register file and, for each read port of the one processing cluster, for each read port of the one processing cluster, a send bit indicating whether data should be read from a corresponding register file address for a location within the register file.

16. The method according to claim 15, further comprising:
employing a programming model for the processing system exposing a hierarchy for connection of the processing clusters by the interconnect.

17. The method according to claim 15, further comprising:
employing a program instruction cache for the processing clusters and the interconnect that is separate from a program instruction cache employed by the processor; and
employing a memory interface coupling the processing clusters and the interconnect to a program data cache employed by the processor.

18. The method according to claim 17, further comprising:
employing a first-in, first-out mechanism using the processing clusters and the interconnect to read live-in variables from and write live-out variables to the processor.

19. The method according to claim 15, further comprising:
coupling each cluster to the interconnect through a connection controller capable of selectively coupling any register within a register file at the respective cluster to any bus within the interconnect, wherein connection of registers to buses within the interconnect is controlled by a configuration register at the respective cluster written during the configuration portion.

20. The method according to claim 15, further comprising:
employing wide instructions for the processing clusters and the interconnect, wherein a number of features within the interconnect that may be reconfigured is limited.

21. The method according to claim 15, further comprising:
executing segments of a program for the processing system having high instruction level parallelism using the processing clusters and the interconnect; and
idling the processing clusters and the interconnect during other segments of the program.

* * * * *